(12) United States Patent
Palumbo et al.

(10) Patent No.: US 12,728,935 B2
(45) Date of Patent: Sep. 8, 2026

(54) TRUCK BED SYSTEM WITH RAISABLE PLATFORM

(71) Applicants: Donald R. Palumbo, Ashburn, VA (US); Randy Luckette, Syracuse, NY (US)

(72) Inventors: Donald R. Palumbo, Ashburn, VA (US); Randy Luckette, Syracuse, NY (US)

( * ) Notice: Subject to any disclaimer, the term of this patent is extended or adjusted under 35 U.S.C. 154(b) by 434 days.

(21) Appl. No.: 18/207,173

(22) Filed: Jun. 8, 2023

(65) Prior Publication Data

US 2023/0399061 A1 Dec. 14, 2023

Related U.S. Application Data

(60) Provisional application No. 63/350,049, filed on Jun. 8, 2022.

(51) Int. Cl.

*B62D 33/08* (2006.01)
*B60J 7/04* (2006.01)
*B60J 7/057* (2006.01)

(52) U.S. Cl.

CPC .............. *B62D 33/08* (2013.01); *B60J 7/042* (2013.01); *B60J 7/0576* (2013.01); *E05Y 2201/448* (2013.01); *E05Y 2201/694* (2013.01); *E05Y 2201/70* (2013.01); *E05Y 2201/702* (2013.01); *E05Y 2800/10* (2013.01); *E05Y 2900/53* (2013.01)

(58) Field of Classification Search

None

See application file for complete search history.

(56) References Cited

U.S. PATENT DOCUMENTS 3,155,423 A * 11/1964 Cripe ..................... B60J 7/1614 49/249
3,286,414 A * 11/1966 Harrison ................ B62D 33/08 296/26.05
3,765,716 A * 10/1973 Van Gompel .......... B60J 7/1614 296/100.08

(Continued)

*Primary Examiner* — Joseph D. Pape

(74) *Attorney, Agent, or Firm* — Attentive Law Group, PLLC; Paul Ratcliffe

(57) ABSTRACT

The present invention provides a truck bed system with a plurality of powered actuators which can raise a raisable platform above the truck bed floor to create a second platform in addition to the truck bed floor surface. The additional or second truck bed platform allows the truck user to use the upper platform for carrying tools and other goods or materials, with the space between the truck bed floor and platform for storing or moving large flat items like lumber and plywood or drywall sheets without displacing or disturbing the contents stowed on the upper platform. The present invention also allows the upper platform to be used for stowing large items like lumber and plywood or drywall sheets, with the space between the truck bed floor and upper platform for carrying tools and other goods or materials. The present invention allows the space between the truck bed floor and the upper platform, when in a raised position, to be used as secure storage when the tailgate is locked. The plurality of actuators can be attached to the truck bed floor, the truck bed walls or integrated into the space within the truck bed side walls.

23 Claims, 22 Drawing Sheets

(56) References Cited

U.S. PATENT DOCUMENTS

| | | | | | |
|---|---|---|---|---|---|
| 5,002,329 | A * | 3/1991 | Rafi-Zadeh | B60J 7/1614 | 248/166 |
| 5,188,418 | A * | 2/1993 | Walworth, Jr. | B62D 25/2054 | 52/630 |
| 7,354,089 | B2 * | 4/2008 | Hobrecht | B60J 7/1614 | 296/183.1 |
| 7,959,200 | B2 * | 6/2011 | Voglmayr | B60P 3/40 | 296/26.05 |
| 8,398,137 | B2 * | 3/2013 | Castillo | B60P 7/10 | 296/183.1 |
| 10,232,783 | B2 * | 3/2019 | Frederick | B60R 5/044 | |
| 10,516,318 | B2 * | 12/2019 | Iversen | F16H 25/20 | |
| 11,305,627 | B2 * | 4/2022 | Piche | B60P 7/02 | |

* cited by examiner 20
328
110
312
308
117
128
318

TRUCK BED SYSTEM WITH RAISABLE PLATFORM

RELATED APPLICATION

This application claims priority to U.S. Provisional Patent Application 63/350,049 filed on Jun. 8, 2022, entitled "TRUCK BED SYSTEM WITH RAISABLE PLATFORM" the entirety of which is incorporated herein.

BACKGROUND OF THE INVENTION

Truck accessories are often focused on improving the use of the truck bed. Such accessories include truck bed racks and covers. Specifically, Tonneau covers are designed to keep rain and the elements out of the truck bed, and often include locks to keep thieves from accessing the truck bed's contents. Some Tonneau covers retract or store in the truck bed when not in use. However, Tonneau covers are not weight-bearing and do not increase the truck bed load capacity or utilization of payload organization. Truck bed racks help improve the utilization of payload organization but are not easily retracted or stored. What is needed is an easily storable truck load system which improves the payload organization of the truck bed, easily stores for large payload needs, and also acts as a protection device for valuable contents stored in the truck bed.

The present invention relates to a truck bed system having a controlled platform which can be raised and lowered from the truck bed floor to create a second weight bearing surface for organizing and transporting materials and supplies or raised to protect contents stored in the truck bed underneath the second surface. More particularly, the present invention incorporates one or more powered actuators for raising and lowering a weight bearing controlled platform. The actuators, which are attached to the controlled platform, can be located in recessed cavities within the truck bed floor or located within cavities within the truck bed walls. The controlled platform provides an ideal solution for those who need to haul large flat items such as a stack of plywood, drywall, and planks without needing to move or remove items already being carried in the bed of the truck. The controlled platform is ideally suited for the bed of a pick-up truck but could be integrated into many other types of vehicles, such as vans, box trucks, trailers, or similar vehicles.

SUMMARY OF THE INVENTION

The present invention provides a powered truck bed system with a powered weight bearing platform which can raise the platform above the truck bed floor to create a second platform in addition to the truck bed floor surface. The additional weight bearing platform allows the truck user to use the upper weight bearing platform for carrying tools, goods or materials, within the truck bed itself, and the space between the truck bed floor and platform for storing or moving other tools, goods, or materials. Specifically, the user can place large flat items like lumber and plywood or drywall sheets on the truck bed floor without displacing or disturbing the contents on the raisable weight bearing platform. Alternatively, the present invention allows the raisable or upper platform to be used for stowing large items like lumber and plywood or drywall sheets, with the space between the truck bed floor and the raisable or upper platform being used for carrying tools and other goods or materials. The present invention allows the space between the truck bed floor and the upper platform, when in a raised position, to be used as secure storage when the tailgate is locked. The platform is raised or lowered by one or more powered actuators which can be located in the truck bed, recessed below the truck bed, or recessed within the truck bed walls.

Specifically, the present invention provides a powered raisable platform system for a vehicle which includes a plurality of powered actuators, where each of the plurality of powered actuators has a motor; each of the plurality of powered actuators has a platform connector configured to connect the powered actuator to a rigid weight bearing platform and has an actuator mount configured to connect the powered actuator to the vehicle. The rigid weight bearing platform is configured to fit in a cargo area of the vehicle and to move in a vertical direction above a cargo floor of the vehicle. The motor of each of the plurality of powered actuators is connected to a power source through a bi-directional control device (i.e., switch or other mobile device app); and the bi-directional control device when activated in a first direction (i.e., up) enables the motor of each of the plurality of powered actuators to raise the powered actuators in the first direction; and wherein as the plurality of powered actuators move in the first direction the rigid weight bearing platform moves in the first direction. Further, when the bidirectional control device is activated in a second direction (i.e., down) the bidirectional control device enables the motor of each of the plurality of powered actuators to move the powered actuators in the second direction; and as the plurality of powered actuators move in the second direction the rigid weight bearing platform moves in the second direction.

The powered raisable platform system may further comprise a plurality of trays for placement in the cargo floor of the vehicle, where each of the plurality of trays receives a base of each of the plurality of powered actuators. The actuator mounts for each actuator of the powered raisable platform are ideally configured to attach to the vehicle in a support location where a vehicle frame support member supports the actuator mount.

In an exemplary implementation, such as in a truck bed, the plurality of actuators are attached to the truck in a cavity within the a truck bed side wall (i.e., inside the truck bed walls). In such an implementation, the truck bed walls would have a plurality of vertical slots at the location of each actuator and each vertical slot would receive a platform connector for connecting the actuator to the platform; wherein as the plurality of powered actuators move the connector moves up and down along the vertical slot to raise or lower the platform. The powered actuators could be scissor type lift actuators or could be nut screw type actuators. An ideal implantation is for a truck and the cargo area is the truck bed. The motor could be an electrically driven motor and the bidirectional control device could be a switch which connects electrical power to the motor. Alternatively, the motors could be a pneumatic or hydraulic motor which transfers air or hydraulic fluid to the actuators. The pneumatic or hydraulic motor could be connected to a motorized pump which pumps the air or hydraulic fluid. Further, the switch could control valves which control flow of the air or fluid to each actuator. The system of the present invention is designed such that the bottom surface of the rigid weight bearing platform rests on the cargo floor when the rigid weight bearing platform is in a fully lowered position.

The present invention, in an exemplary configuration provide a powered raisable platform system for a truck bed with a rigid weight bearing platform shaped to fit within the truck bed and has: (1) a left front powered actuator positioned in a left front location in the truck bed, wherein the left front powered actuator has a motor; (2) a left rear powered actuator positioned in a left rear location in the truck bed, wherein the left front powered actuator has a motor; (3) a right front powered actuator positioned in a right front location in the truck bed, wherein the right front powered actuator has a motor; and (4) a right rear powered actuator positioned in a right rear location in the truck bed, wherein the right front powered actuator has a motor. The system would also have a left front connector for connecting the left front powered actuator to a left front connection point on the rigid weight bearing platform; a left rear connector for connecting the left rear powered actuator to a left rear connection point of the rigid weight bearing platform; a right front connector for connecting the right front powered actuator to a right front connection point of the rigid weight bearing platform; and a right rear connector for connecting the right rear powered actuator to a right rear connection point of the rigid weight bearing platform. This configuration would also have a left front actuator mount for connecting the left front powered actuator to a left front truck bed connection point; a left rear actuator mount for connecting the left rear powered actuator to a left rear truck bed connection point; a right front actuator mount for connecting the right front powered actuator to a right front truck bed connection point; and a right rear actuator mount for connecting the right rear powered actuator to a right rear truck bed connection point. The system would include a bi-directional control device which is connected to all or each motor; and the bidirectional control device when activated in a first direction enables each motor to raise each powered actuator a first direction; and as each powered actuator moves in the first direction the rigid weight bearing platform moves in the first direction. The motors could be electrically driven motors, pneumatic motors, or hydraulic motors. The actuators could be scissor type lift actuators, nut screw actuators, telescoping actuators; a chain-sprocket actuator, or a cable pulley actuator. The actuator mounts of the powered raisable platform system can be configured to connect each actuator to a tray which is placed or connected to a cutout in the truck bed floor, connected directly to the truck bed side wall, or configured to connect each actuator to a cavity within a truck bed wall (i.e., inside the truck bed walls). The powered raisable platform system is designed so that the bottom surface of the rigid weight bearing platform rests on the truck bed floor when the rigid weight bearing platform is in a fully lowered position. Further, each actuator may be contained with its own actuator housing.

BRIEF DESCRIPTION OF THE DRAWINGS

The embodiments herein will be better understood from the following detailed description with reference to the drawings, in which.

DETAILED DESCRIPTION

Figure 1A:
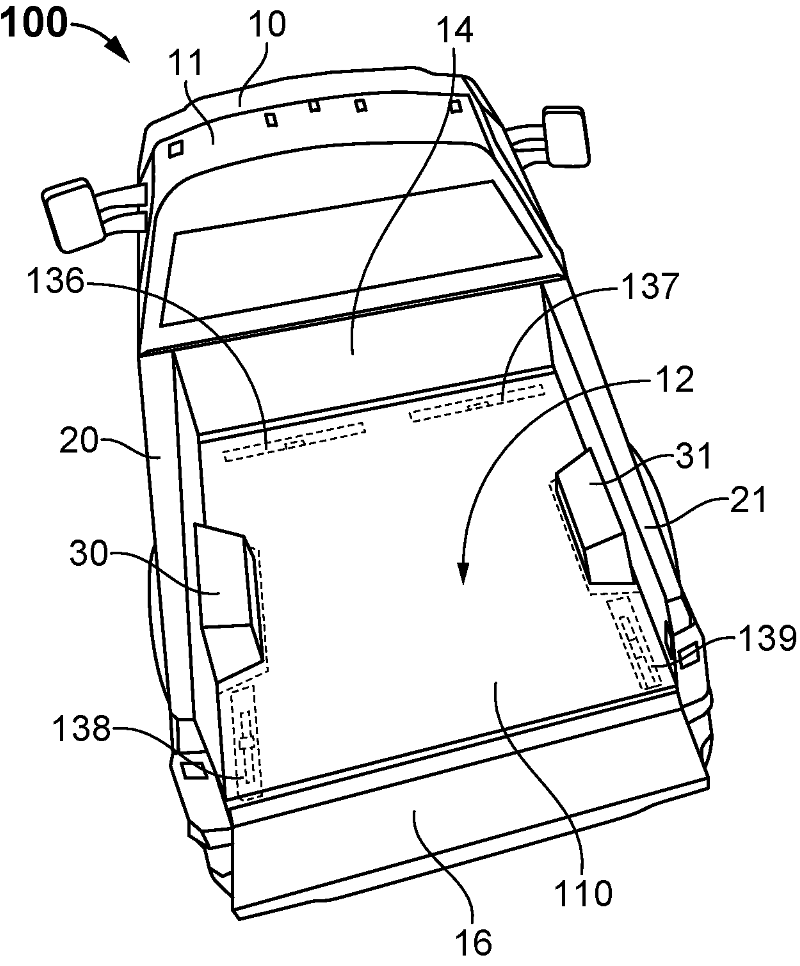
FIG. 1A provides a truck bed system according to an exemplary embodiment of the present invention with the raisable platform of the truck bed system being shown in an initial lowered resting position.

Hereinafter, aspects of the parts, elements, and associated system in accordance with various embodiments of the invention will be described. As used herein, any term in the singular (i.e., actuator) may be interpreted to be in the plural (i.e., actuators), and alternatively, any term in the plural may be interpreted to be in the singular. It is appreciated that features of one embodiment as described herein may be used in conjunction with other embodiments.

Accordingly, those of ordinary skill in the art will recognize that a modification, an equivalent, and/or an alternative on the various embodiments described herein may be variously made without departing from the scope and spirit of the present disclosure.

The present invention can be more fully understood by reading the following detailed description together with the accompanying drawings (FIGS. 1-16), in which like reference indicators are used to designate like elements.

As seen in FIG. 1, an exemplary embodiment of the present invention provides a truck bed system 100 configured to rest along the surface of a truck bed 12 of a truck 10 or other similar vehicle. The truck bed system 100 includes a platform 110 movable to various heights between a lowered or retracted resting position on the truck bed floor 12 (see FIG. 1A), to a partially raised position (see FIG. 1B), to a fully elevated position (see FIG. 1C) such that the height is above or below the top surface of the truck bed walls 20, 21. The fully elevated position of the platform 110 may accommodate the use of various truck bed covers such as Tonneau or other truck bed covers. The truck bed system 100 includes a plurality of vertical actuators 126, 127, 128, 129 to raise and lower the platform 110, a corresponding plurality of receptacles or trays 150, for housing the vertical actuators 126, 127, 128, 129, and a control element or platform switch 115 to allow a user to control the vertical actuators 126, 127, 128, 129.

Figure 4A:
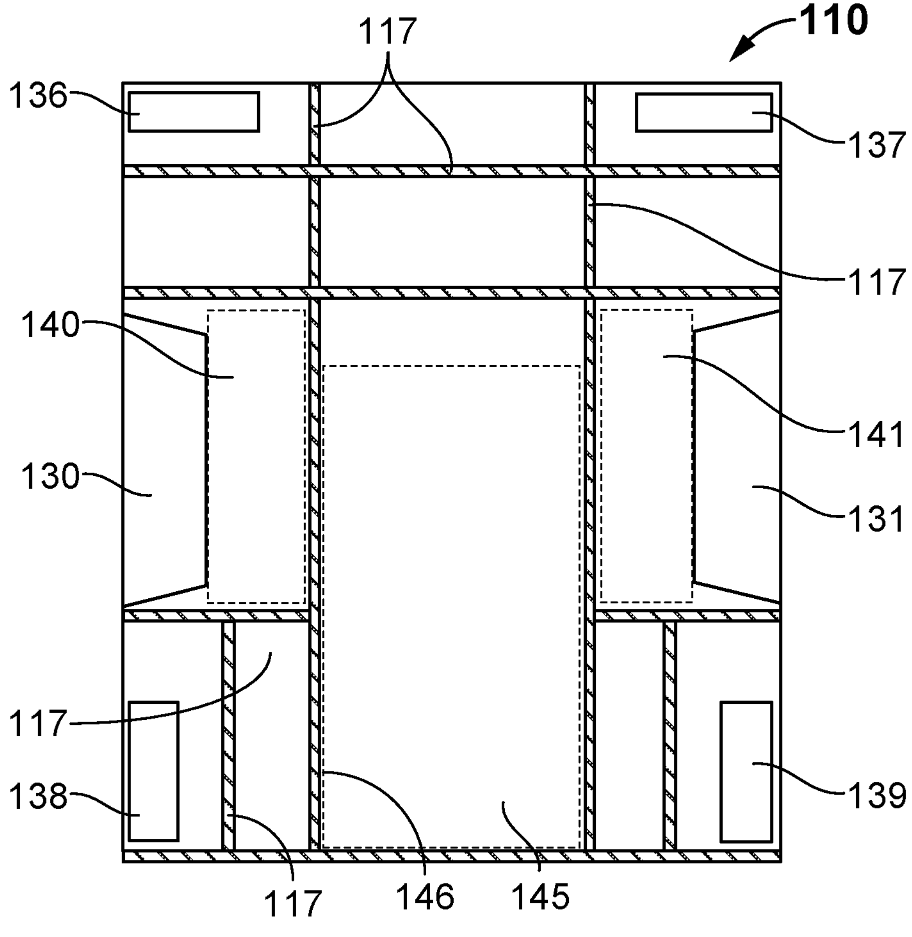
FIG. 4A is a top view of a first configuration of the truck bed platform shown FIGS. 1A-1C.
Figure 4B:
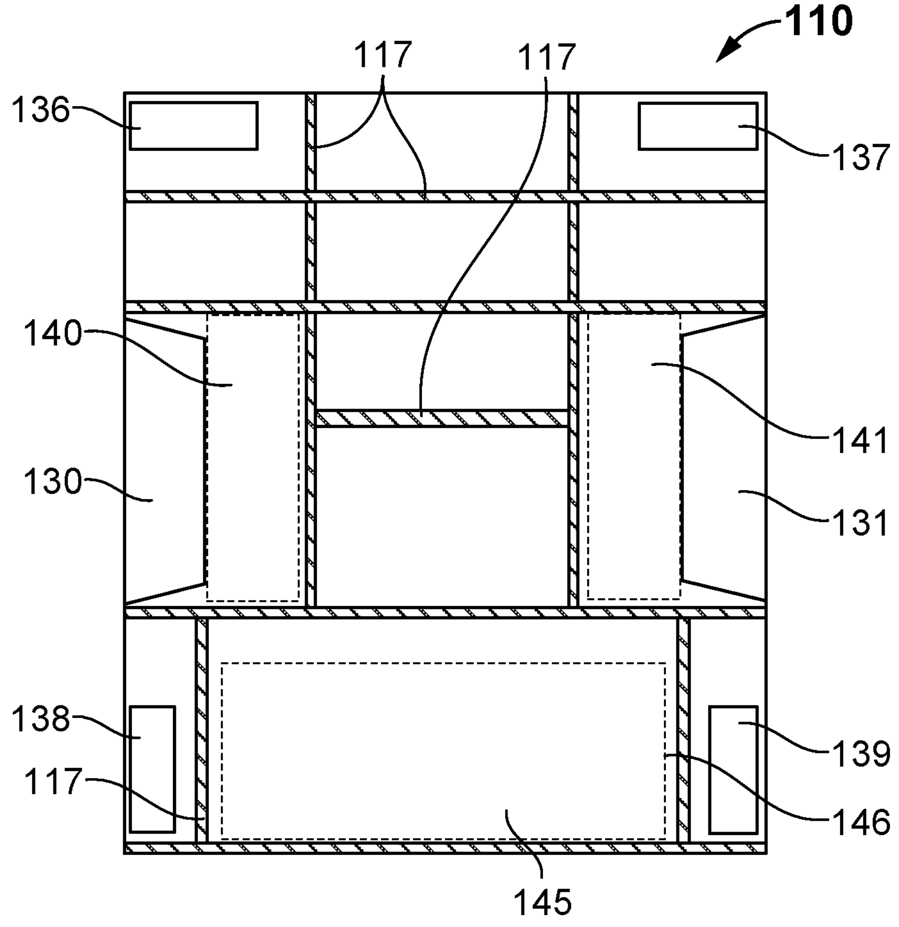
FIG. 4B is a top view of a second configuration of the truck bed platform shown FIGS. 1A-1C.
Figure 6:
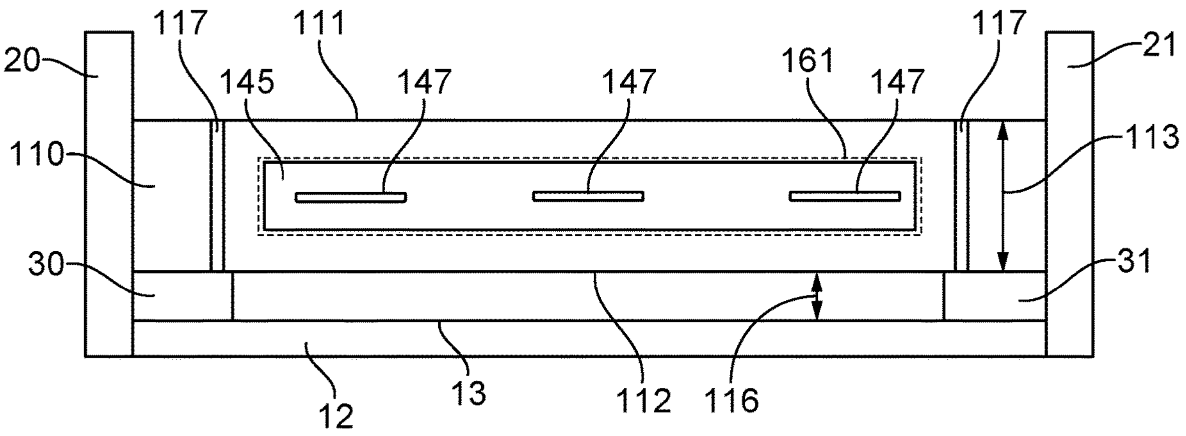
FIG. 6 provides a rear view of the present invention depicting a slidable working surface integrated into the raisable weight bearing platform.

As seen in FIG. 6, the platform 110 includes a bottom surface 112, a top surface 111 opposite the bottom surface 112, a thickness 113, and a perimeter extending along the outer surface of the platform 110. The top surface 111 may be smooth or corrugated to match the surface of the truck bed 12 floor so that the platform 110 may appear to an observer as the truck bed floor when the platform 110 is in its resting or lowered position. The bottom surface 112 may include a plurality of attachments or connection points (not shown) to facilitate connection between the vertical actuators 126, 127, 128, 129 in FIG. 1B and the platform 110. In an exemplary embodiment, the platform 110 may be configured with access panels 136, 137, 138, 139, as seen in FIGS. 4A and 4B, which may be removeable, allowing easy access to the vertical actuators 126, 127, 128, 129 should one or more of the vertical actuators 126, 127, 128, 129 require maintenance or replacement. The platform 110 may be form-fitted so that the perimeter of the platform 110 abuts or is nearly adjacent to the inner walls of the truck bed walls 20, 21 of the truck bed. The perimeter may include a raised lip along the entire perimeter or parts of the perimeter. The lip may be approximately 1 inch tall and serves to minimize debris or objects from rolling off the platform and into the small space between the platform edge and truck bed side walls 20, 21. The width of the platform 110 may vary along the length of the truck bed 12 to accommodate the shape of the truck bed 12 and accommodate the wheel wells 30, 31 but is generally the width of the truck bed 12. In alternative embodiments, the platform 110 may have a single width that extends between the wheel wells 30, 31 of the truck 10 and a length extending from the front of the truck bed 12 to the rear of the truck bed 12 or tailgate 16.

The platform 110 may be made of a metal, rigid plastic, or other durable, non-deformable material known in the art. The thickness 113 of the platform 110 is such that the platform 110, in combination with the vertical actuators 126, 127, 128, 129, exhibits a structural strength sufficient to support a payload less than or equal to the vehicle's maximum payload. In various embodiments, the thickness 113 of the platform 110 may range from approximately one inch to approximately two inches. In other embodiments, the thickness 113 may be less than approximately one inch thick or more than approximately two inches thick.

Figure 2:
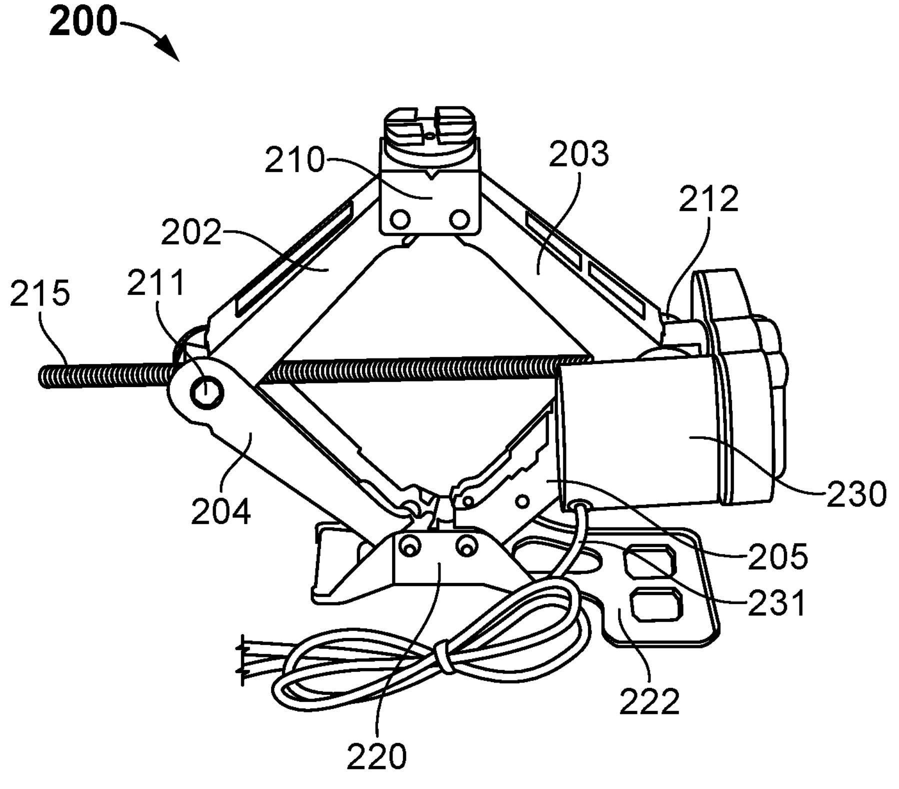
FIG. 2 depicts a scissor jack-type of vertical actuator for use with an embodiment of the present invention.
Figure 3:
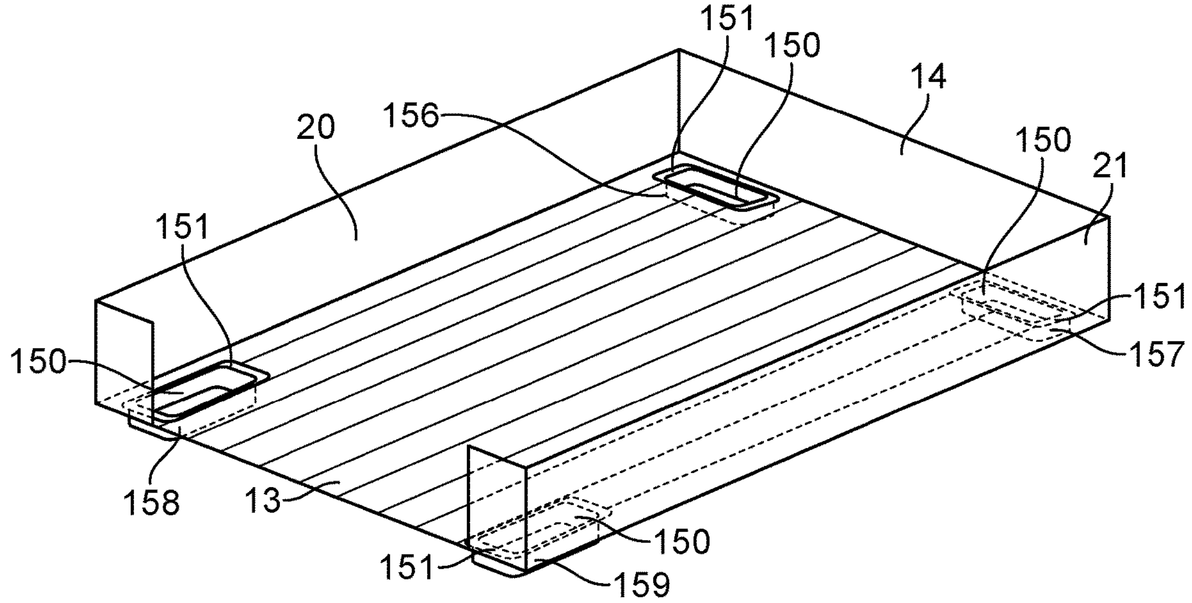
FIG. 3 depicts a cutaway view of a truck bed with trays attached to the truck bed floor for retaining vertical actuators according to an embodiment of the present invention.

Referring now to FIGS. 2 and 3, in an exemplary embodiment, the truck bed system 100 employs a plurality of actuators 126, 127, 128, 129, which may be scissor jack actuators 200 (see FIG. 2) to raise and lower the platform 110. The scissor jack actuators 200 include a left upper scissor arm 202 and a right upper scissor arm 203 which are joined together by an upper double hinge connector 210. The left upper arm 202 is connected to the left lower arm 204 by a left hinge connection 211. The right upper arm 203 is connected to the right lower arm 205 by a right hinge connection 212. The left lower arm 204 and right lower arm 205 are connected to a base double hinge connector 220. The scissor jack actuators 200 also have a base plate 222 which is connected to the base double hinge connection 220. The base plate 222 is configured to connect to a tray 150 (see in FIG. 3) which is connected to the truck bed 12 floor such that the actuator 200 is recessed within the tray 150. The connection may be by one or more fasteners (not shown) or by welding. The upper hinge connector 210 is configured to connect to the bottom surface 112 of the platform 110.

The scissor jack actuator 200 further includes a worm screw 215 which is driven by an electric motor 230 configured to connect to the worm screw 215 at an end thereof in a manner which can rotate the worm screw 215. Each scissor jack actuator 200 contains its own electric motor 230. Each motor 230 is wired to the control system 400 (see FIG. 13) which may be a part of the vehicle manufacturer's wiring harness or be a separate harness connected to the vehicles power system. The motor 230 is laterally offset from the vertical plane of the actuator 200 so that the motor 230 does not interfere with the arms 202, 203, 204, 205 or interfere with the platform 110 when the platform 110 is in its resting position. As is evident to one skilled in the art, the motor 230 can drive the worm screw 215 forward, thereby bringing the left side arms 202, 204 and right-side scissor arms 203, 205 together thereby raising the height of the platform 110. The motor 230 can also drive the worm screw 215 in reverse, thereby separating the left side arms 202, 204 and right-side scissor arms 203, 205 thereby lowering the height of the platform 110.

In an exemplary embodiment, the control or power switch 115 would be connected to the power of the truck 10 or vehicle and would be attached to the one or more motors 230. Thus, when the power switch 115 is activated, it connects the electrical power from the truck 10 to the motors 230 enabling the motors to operate in the direction (up or down) the user has selected.

Figure 1B:
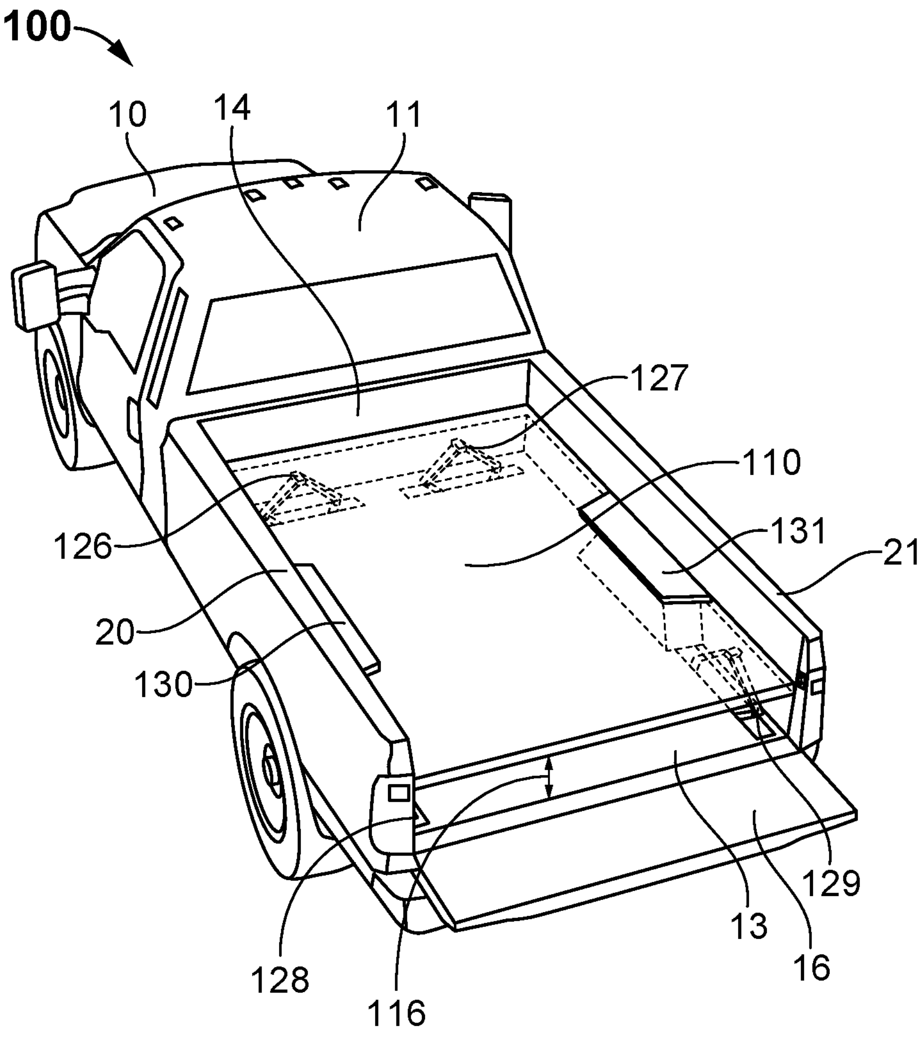
FIG. 1B provides a truck bed system according to an exemplary embodiment of the present invention with the raisable platform of the truck bed system being shown in a partially raised position.
Figure 1C:
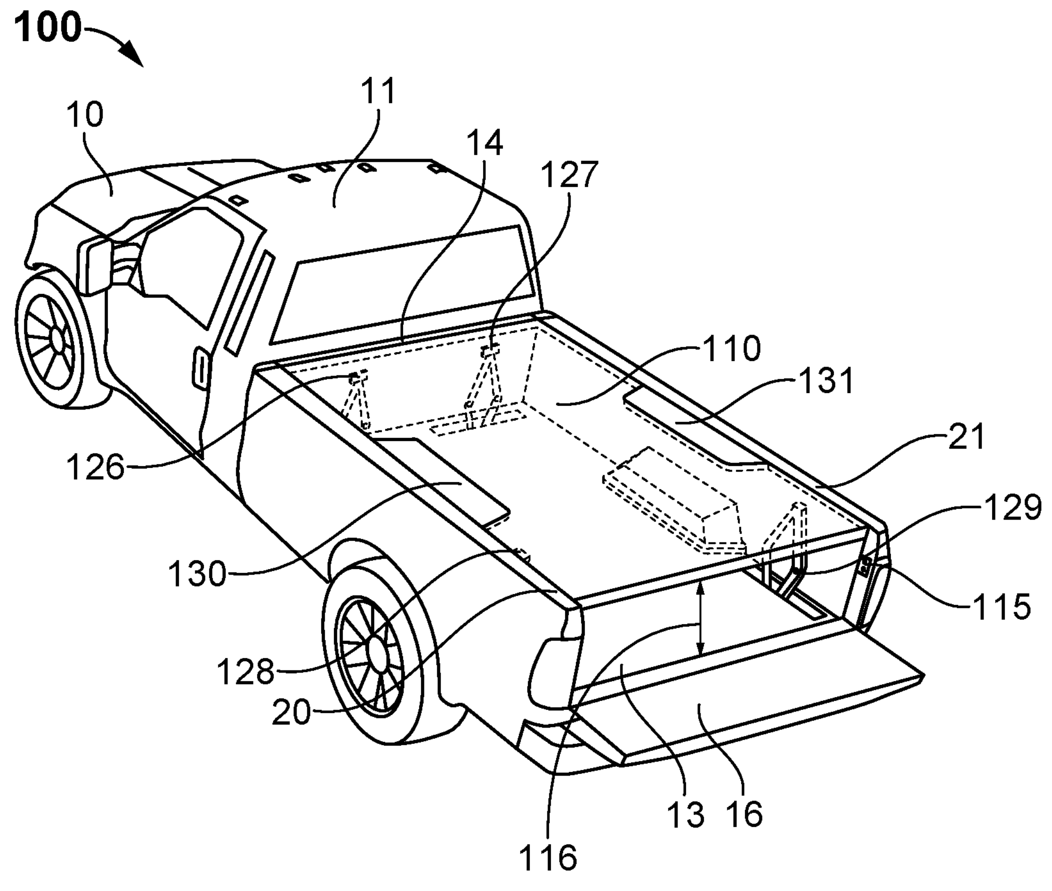
FIG. 1C provides a truck bed system according to an exemplary embodiment of the present invention with the raisable platform of the truck bed system being shown in a fully raised position.
Figure 1D:
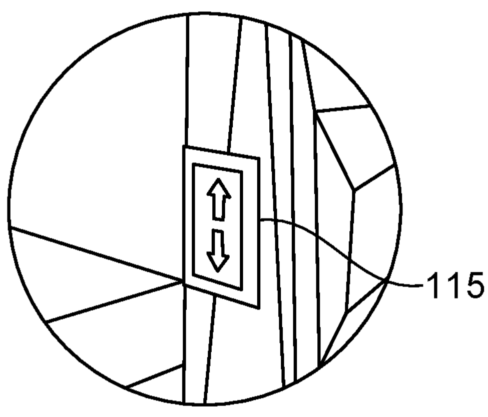
FIG. 1D provides an illustration of a control mechanism located on the vehicle for use in connection with the truck bed system of the present invention.
Figure 16:
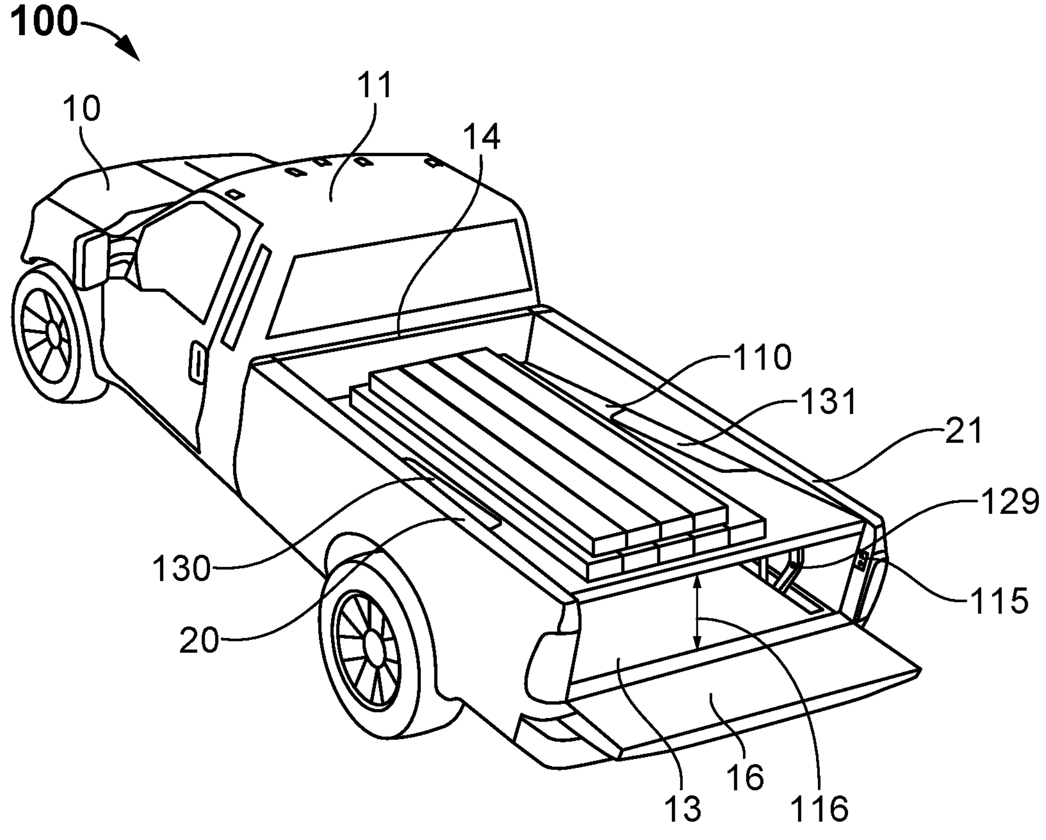
FIG. 16 provides a perspective view of an embodiment showing the truck bed system of the present invention with the platform tilted.

In an exemplary embodiment, as seen in FIGS. 1A-1C, the system 100 includes four actuators 126, 127, 128, 129 in each corner of the truck bed 12 located within openings 156, 157, 158, 159 in truck bed 12. Trays 150 are placed within the openings 156, 157, 158, 159 in the truck bed floor 13. The trays 150 may have drainage holes (not shown) at the bottom to allow any water entering the trays 150 to drain from the trays 150 through the openings 156, 157, 158, 159. The motors 230 (see FIG. 2) may be activated by a platform switch 115 electrically connected to each of the motors 230. The motors 230 operate in a continuous fluid motion such that no minimum interval movements of the platform 110 are required. This helps ensure that the platform 110 remains parallel to the vehicle manufacturer's truck bed floor. In an additional embodiment, the two front scissor jack actuators 126, 127 and the two rear scissor jack actuators 128, 129 are configured to be actuated independently of each other. In such an embodiment, as seen in FIG. 16, the platform 110 may be tilted either away from or towards the front of the truck bed 12, thereby generating a tilted or inclined surface to facilitate the loading or unloading of materials or to assist the load being carried from sliding off the platform 110. The platform 110 could also be titled to the left side or right side by raising or lowering the actuators 126, 127, 128, 129 on one side of the truck bed 12 at a different height then the actuators 126, 127, 128, 129 on the other side of the truck bed 12.

The platform switch 115 may be an activation switch located where convenient anywhere on the vehicle, such as, for instance, inside the truck bed 12 or on the tailgate 16, inside the cab 11 of the truck 10, on the dashboard, on the center console, or as part of the vehicle's system console, among other locations. The platform 110, through the actuators 126, 127, 128, 129, may also be configured to be controlled or activated from a mobile application 410 or other software, through the control module 400 (see FIG. 13) that allows for remote actuation of the platform 110 from a cell phone or other electronic device. The truck 10 or vehicle may also employ more than one platform switch 115 such as one inside the vehicle (i.e., a cab switch 412 on the dashboard) and one in the truck bed 115. The platform switch 115 may also be configured with various preset heights. The platform switch 115 near the rear of the truck bed 12 or near the tailgate 16 may have a protective cover to prevent damage from the weather or from damage from inadvertently being hit.

Referring to FIG. 3, the truck bed 12 floor contains openings 156, 157, 158, 159 within which receptacles, also referred to as jack trays 150, are placed. In such embodiment, the receptacles or trays include a 90-degree outwardly flared flange or lip 151 to rest atop the cutouts 156, 157, 158, 159 and provide a surface to attach to the truck bed floor 13 of the truck bed 12 and further support for the platform 110 and the load carried thereon. The receptacles 150 have a length greater than the length of the actuators 126, 127, 128, 129 in their un-extended or flattened position, a width greater than the combined widths of the actuators 126, 127, 128, 129 and the laterally offset motor 230, and a depth greater than the height of the actuators 126, 127, 128, 129 in its un-extended or flattened position. In such embodiment, the receptacles 150 fully house the actuators 126, 127, 128, 129 and its components (i.e., the electric motor 230) therein when the platform 110 is in its lowered or resting position, thereby allowing the platform 110 to sit directly on the truck bed floor 13. The receptacles 150 may be made of steel or other similar material and are strong enough to support the attachment of the actuators 126, 127, 128, 129 and carry the load placed on the platform 110.

In an exemplary embodiment, the two front scissor jack actuators 126, 127 (i.e., closest to the truck cab 11) and corresponding front receptacles or trays 150 are arranged perpendicular with the length of the truck bed 12. In an alternative embodiment, the two front scissor jack actuators 126, 127 and corresponding front receptacles or trays 150 could be placed parallel to the truck bed walls 20, 21 or could be replaced with a single longer front scissor jack actuator and corresponding single front tray positioned perpendicular to the length of the truck bed 12 and extending along the width of the truck bed 12. The two rear scissor jack actuators 128, 129 (i.e., near the tailgate 16) and corresponding rear receptacles or trays 150 positioned parallel with the length of the truck bed 12.

Referring now to FIGS. 4A and 4B, the platform 110 could also include removeable access panels 136, 137, 138, 139 on the top surface 111 of the platform 110. The removable access panels 136, 137, 138, 139 provide access to the actuators 126, 127, 128, 129 and the attachments to the platform 110. Access to the actuators 126, 127, 128, 129 and the attachments to the platform 110 allows the platform 110 to be disconnected and removed if needed for maintenance or repair. The platform 110 could include additional access panels (not shown) in various locations along the platform 110 surface to enable access to the space underneath the platform 110 to clear debris, access tools or material, or for allowing the platform 110 to accommodate or be lowered over or around a gooseneck hitch or other truck bed accessory.

Figure 5A:
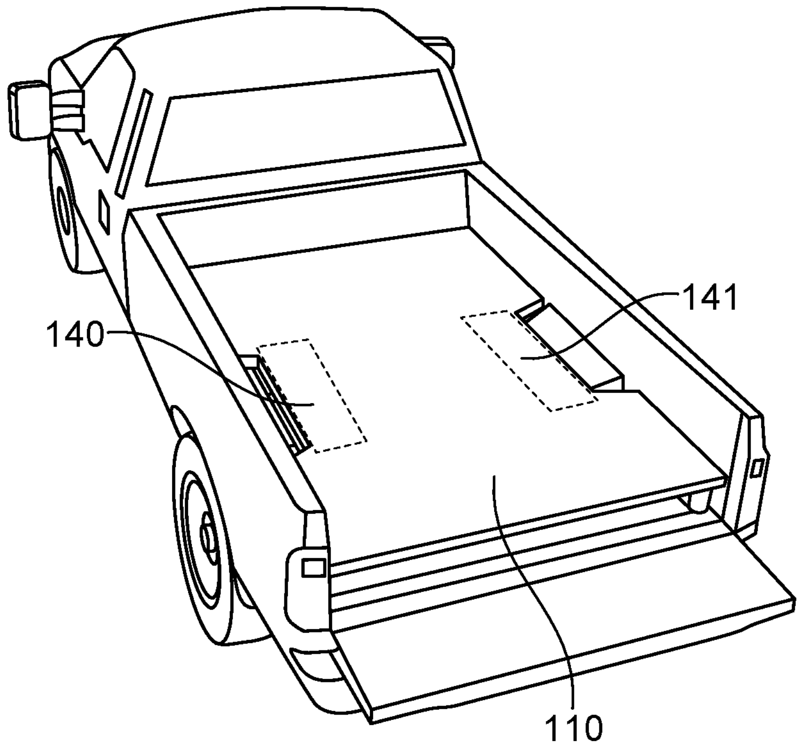
FIG. 5A provides a perspective view of the present invention having slidable wheel well covers which slide into cavities in the platform.
Figure 5B:
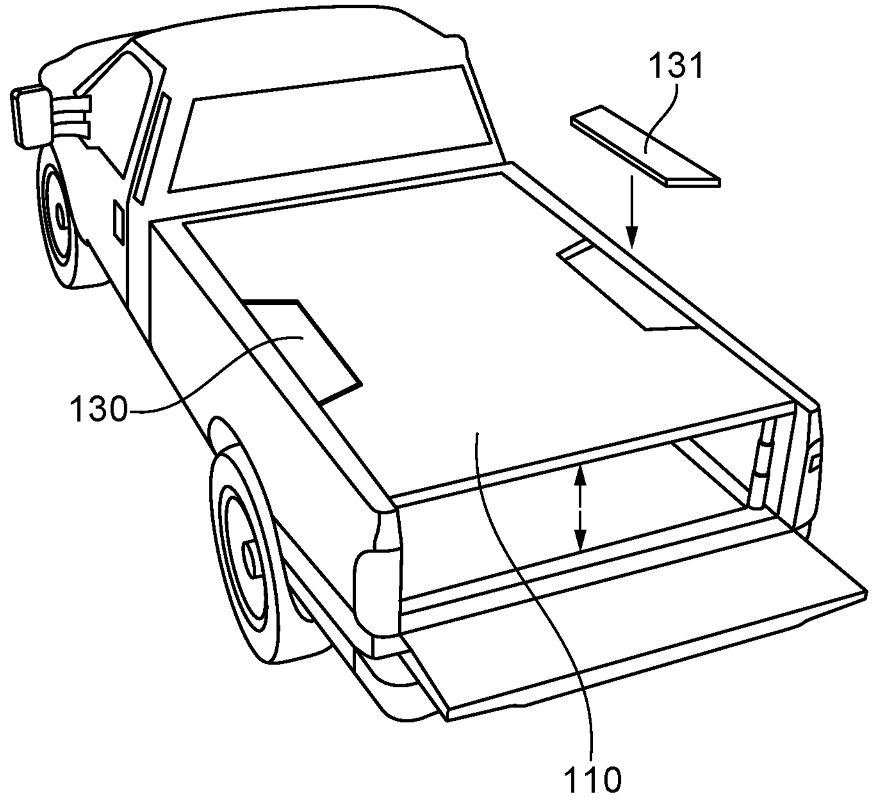
FIG. 5B provides a perspective view of the present invention having removeable wheel well covers.
Figure 5C:
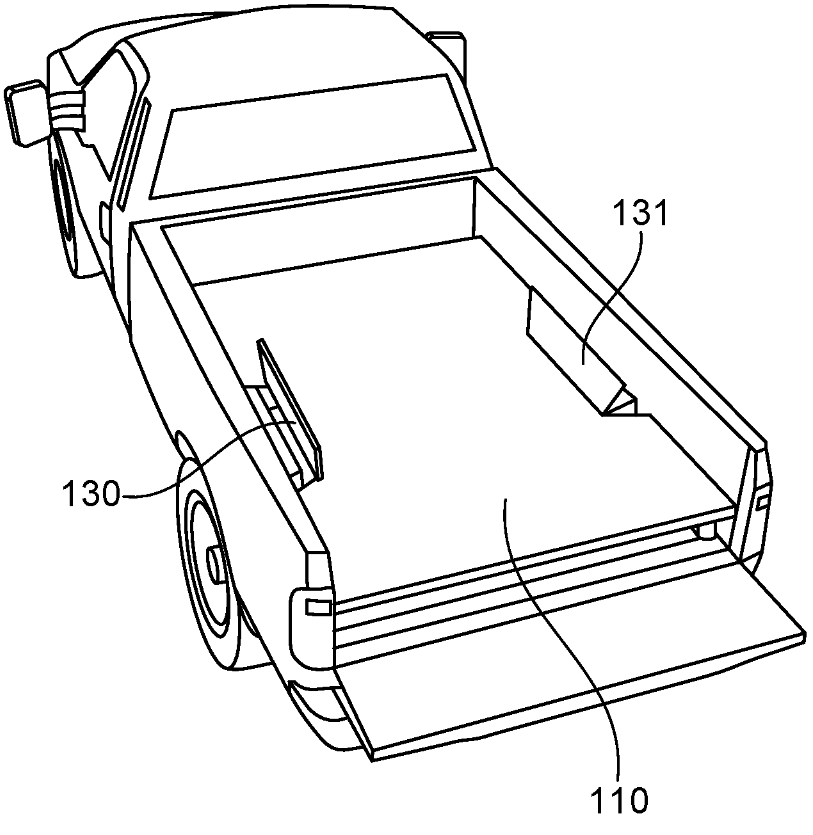
FIG. 5C provides a perspective view of the present invention having hinged wheel well covers.

As seen in FIGS. 4A, 4B and FIGS. 5A, 5B, and 5C, the present invention includes the platform 110 having slidable wheel well covers 130, 131 that may be pulled from slots or openings 140, 141 (shown in dashed lines) within the platform 110. The wheel well covers 130, 131 function to close off gaps between the truck side wall 20, 21 and the platform 110 when the platform 110 is elevated above the height of the wheel wells (see also FIGS. 5A, 5B, and 5C). FIGS. 5A, 5B, and 5C illustrate additional designs and methods of affixing wheel well covers 130, 131 to the platform 110. For example, wheel well covers 130, 131 can be detachable or detachably connected to the platform 110 (see FIG. 5B) or the wheel well covers 130, 131 can be hingedly affixed to the platform 110 (see FIG. 5C) allowing the user to flip the covers 130, 131 out of the way.

The platform 110 may also include one or more slidable portions that may be retracted from the platform 110 to provide an extendible work surface 145 at a higher elevation than the truck bed floor 13 or the tailgate 16. In an exemplary embodiment, the slidable work surface 145 fits within a work surface cavity 146 that extends into the platform 110 (see FIG. 4A). The slidable rear work surface 145 may also be wider and shorter (see FIG. 4B). The rear workstation cavity 146 is an opening sized to fit within the thickness 113 of the platform 110 (see FIG. 6). In an embodiment, the work surfaces 145 may be movable along rollers within a rail assembly (not shown) that supports the weight of the work surface 145 as it extends out and cantilevers over the end of the platform 110 and over the tailgate 16. In such embodiment, the rail assembly (not shown) includes a catch or stop to restrain the movement of the rear work surface 145 too far to prevent unintentional detachment of the rear work surface 145 from the platform 110. The rear work surface 145 may be slidable moved by the user through one or more handles 147.

In a further embodiment, rear work surface 145 may include fold-down legs (not shown) that are concealed and attached to the underside of the rear work surface 145. The fold-down legs attach to the slidable rear work surfaces 145 on one end with a hinge assembly and, when the rear work surfaces 145 are extended from the platform 110, the lower end of the legs could sit on the tailgate to provide greater stability and support for additional weight. Alternatively, each fold-down leg may be extendable by telescoping to a fixed length in a way that is similar to the legs of a folding table. This would allow the fold-down legs to reach the ground if the rear work surface 145 is extended beyond the tailgate 16.

Additional features or components of the platform 110 could include tie-down anchors which could be attached to or integrated into the platform 110 allowing any payload on the platform 110 to be tied down or secured.

Internally, the platform 110 is comprised of structural support elements 117 providing the appropriate rigid structure the platform 110 needs to support the weight of the materials being carried on the platform 110. The structure support elements 117 would be dispersed throughout the length and width of the platform 110 or may be a complete panel of structure support elements 117.

Figure 7A:
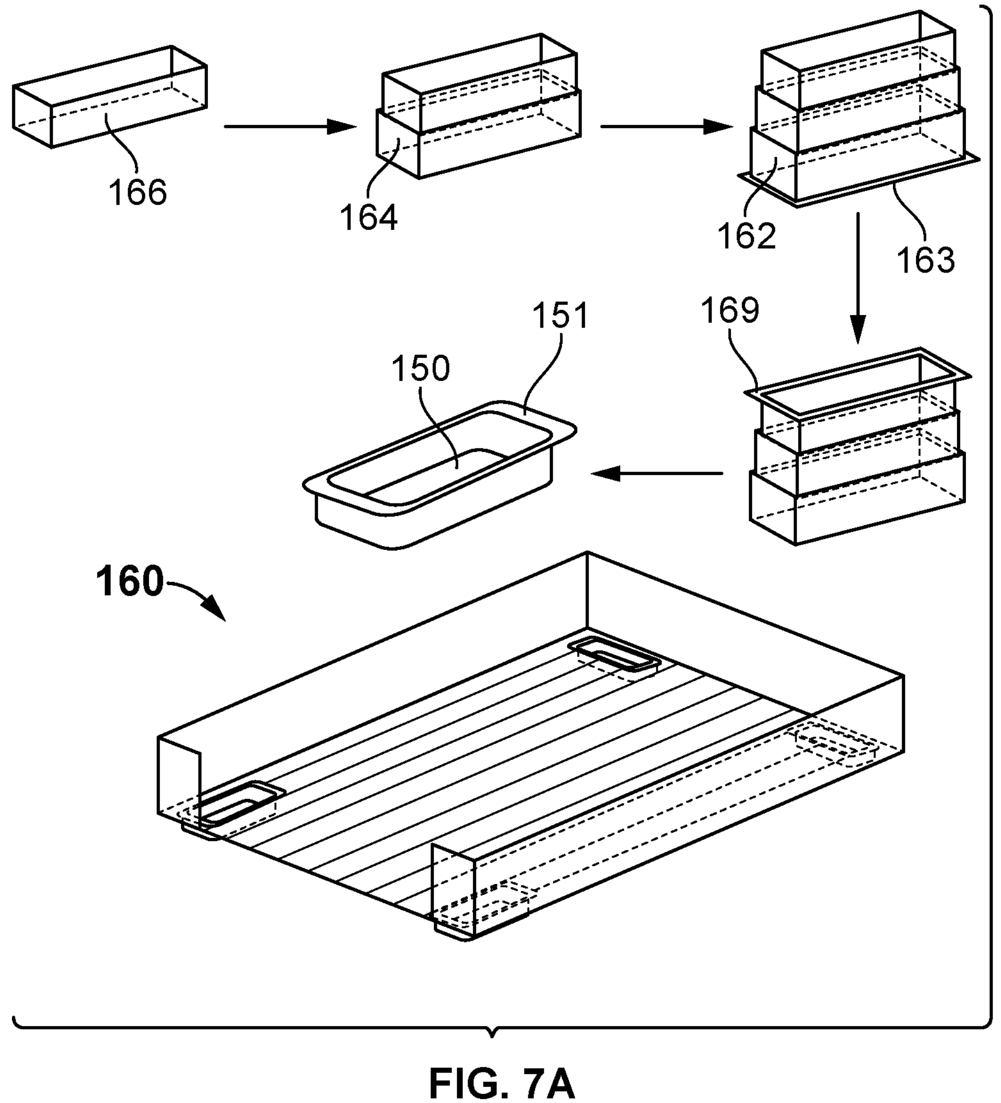
FIG. 7A provides a perspective view of a telescoping barrier system to protect the actuators from physical damage.
Figure 7B:
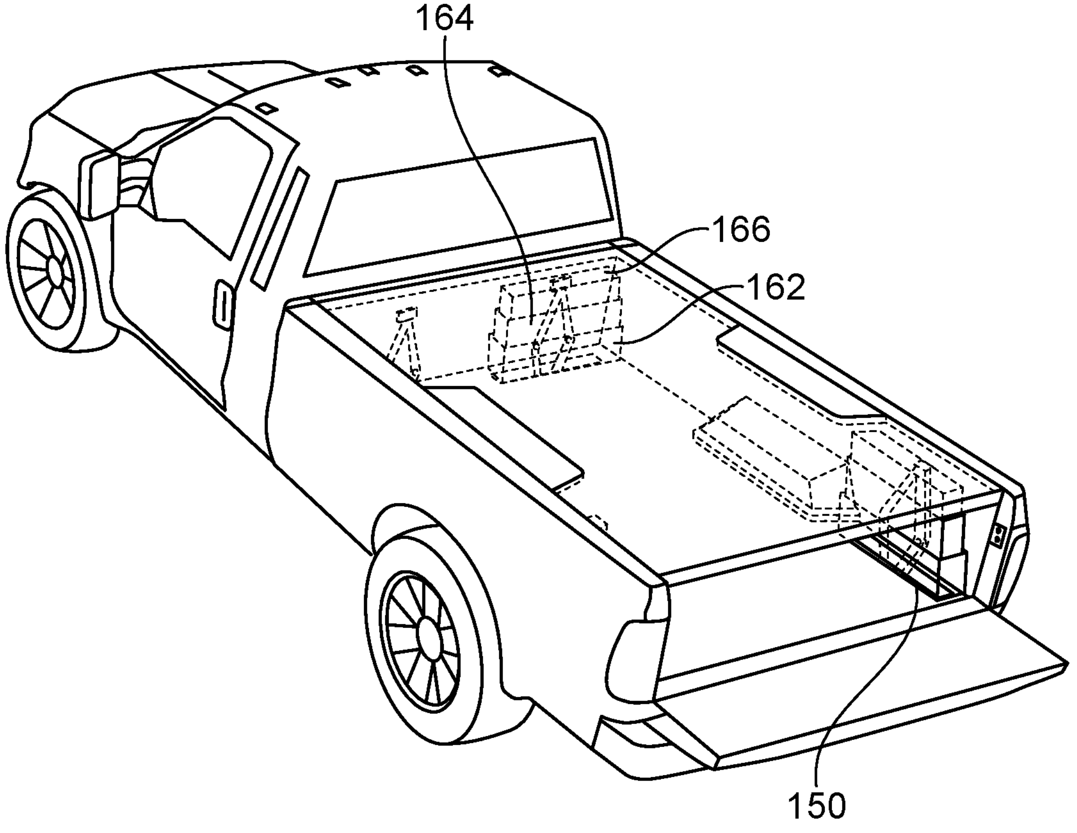
FIG. 7B provides a perspective view of the truck bed system of FIG. 1 with the telescoping barriers installed to protect the actuators from physical damage.

FIGS. 7A and B provide various illustrations of a protective barrier system adapted to shield the vertical actuators 126, 127, 128, 129 from impact damage during normal use of truck bed system 100. A telescoping protection system 160 includes a series of generally rectangular components 162, 164, 166 with sequentially smaller dimensions which can telescope or are stackable. The bottom-most component 162 is sized and shaped to fit within the receptacles or trays 150 and includes an outer lower lip or flange 163 extending outwardly from the bottom edge thereof for connecting or mating with the flange 151 of the tray 150. The top component 166 of the barrier 160 may include an upper tray flange 169 for connecting the top of the barrier 160 to the bottom surface 112 of the platform 110. An additional embodiment of the protective barrier system 160 (not shown) provides a collapsible scissor or lattice barrier which would extend the width of the vertical actuators 126, 127, 128, 129 or the width of the truck bed 13. The additional embodiment 161 can be attached to the truck bed 13 and the bottom surface 112 of the platform 110.

Figure 8:
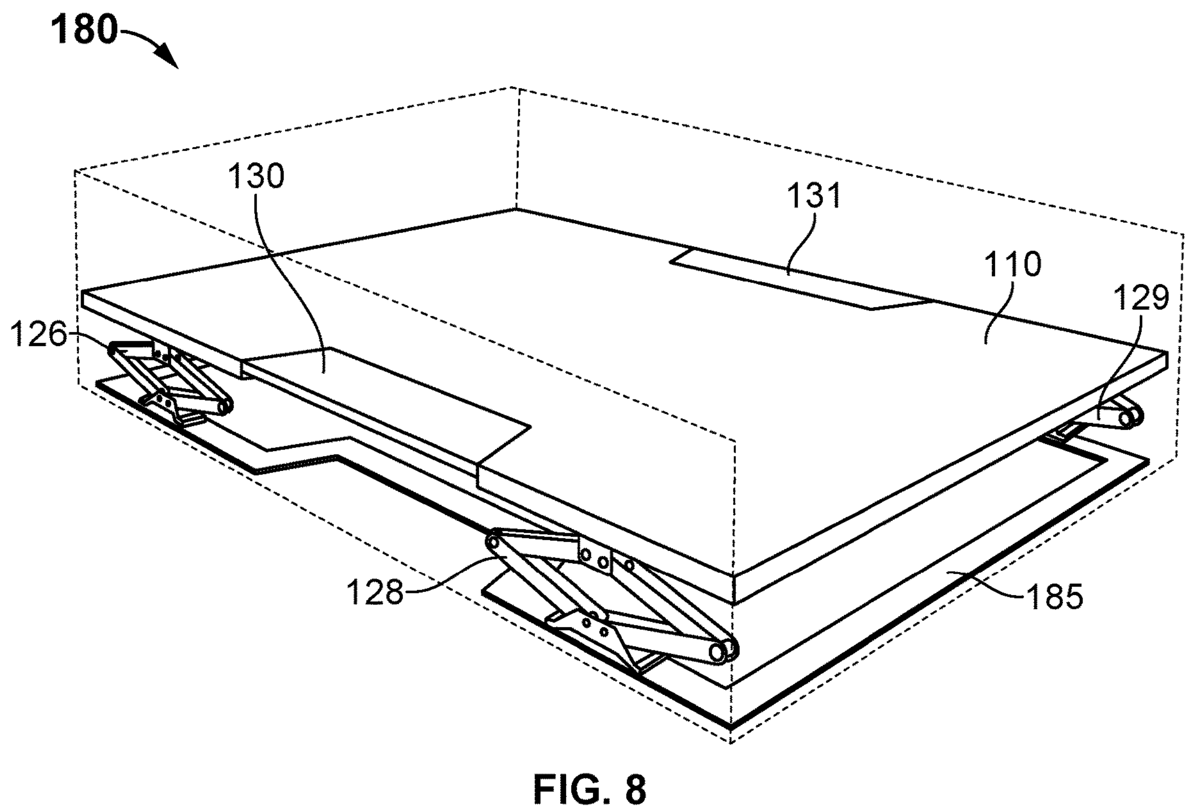
FIG. 8 provides an alternative embodiment of the present invention wherein the truck bed system is a pre-assembled self-contained unit that can be installed in the truck bed after the truck has been manufactured.

FIG. 8 provides a perspective view of an additional embodiment of a drop in system 180 with the platform 110 in a partially raised position. This additional embodiment of the drop in system 180 includes a base 185 with dimensions configured to fit around the wheel wells 30, 31 in the truck bed 12. The drop in system 180 has the actuators 126, 127, 128, 129 attached to the base 185 and the platform 110. This additional embodiment 180 provides a system which can be attached to a truck bed 12 which is not able to accommodate the cutouts 156, 157, 158, 159 which receive the jack trays 150 (see FIG. 3). The base 185 would be set inside the truck bed 12 and could be mechanically attached to the truck bed 12, the truck bed side walls 20, 21, or rest in the truck bed 12 unattached. In the unattached installation, the weight of the system 180 would keep the system in place or could have additional aspects, like spacers or weights added around the base 185 to keep the base 185 and platform 110 from moving. The platform 110 still includes the wheel covers 130, 131 which can be recessed or removable as more fully discussed above (see FIG. 5). The additional drop in embodiment of the system 180 could also include the retractable work surface 145 (see FIG. 4). The base 185 could be thin with the actuators 126, 127, 128, 129 exposed or could be thick enough to fully enclose the actuators 126, 127, 128, 129 within the base 185.

Figure 9:
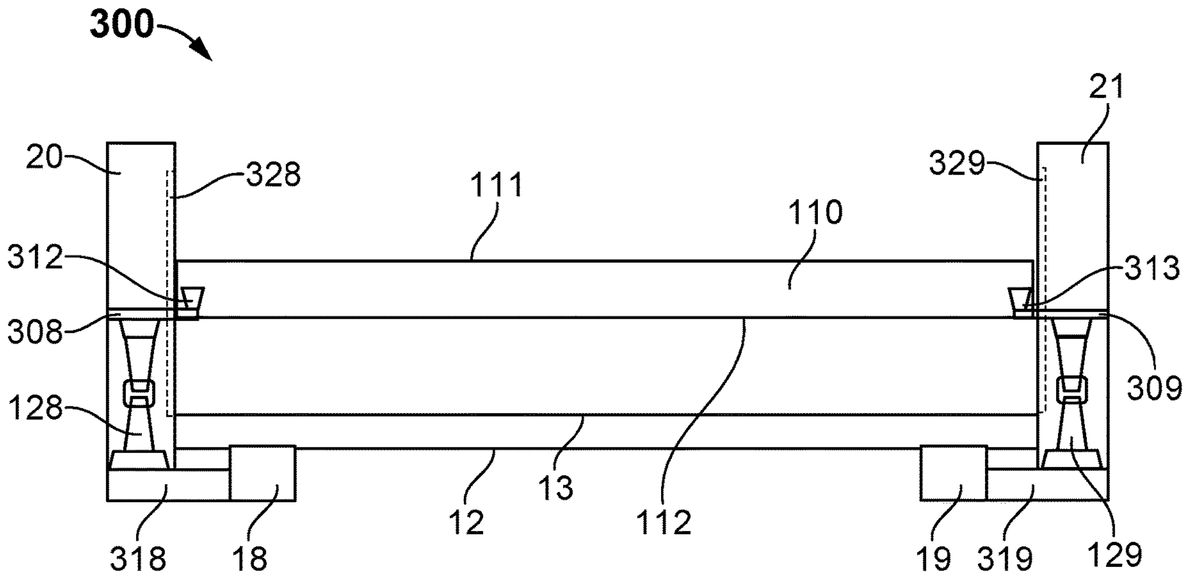
FIG. 9 provides a rear view of an additional embodiment of the truck bed system having the actuators located inside of the truck bed side walls.

As seen in FIGS. 9, 10, 11A and 11B, the present invention may provide an alternative lifting configuration 300 with the actuators 126, 127, 128, 129 embedded within the truck bed side walls 20, 21. As seen in FIG. 9, which provides a rear cut away view, shows the left rear actuator 128 embedded within the left truck wall 20 and the right rear actuator 129 embedded within the right truck wall 21. The truck 10 has a left side chassis member 18 and a right-side chassis member 19. The chassis or frame of the vehicle supports the weight of the vehicle or truck 10 which typically has a suspension connected to the chassis and the suspension is connected to the wheels. Above the chassis of truck 10 is the truck cab 11 and the truck bed 12 (in the rear). The truck bed 12 is supported by the left side chassis member 18 and right-side chassis member 19. Attached to the left side chassis member 18 is a left side chassis bracket 318 and attached to the right-side chassis member 19 is a right-side chassis bracket 319. The brackets 318, 319 provide support for the base of the left and right-side actuators 128, 129. The brackets 318, 319 extend below or into the cavity in the truck bed walls 20, 21. The actuators 128, 129 fit within the cavity in the truck bed walls 20, 21. Each actuator 128, 129 has an extension bar 308, 309 attached to the top of the actuator 128, 129. The extension bar 308, 309 extends through a vertical slot 328, 329 in the truck bed wall 20, 21. As seen in FIG. 9, the extension bar 308, 309 has a platform connector 312, 313 for connecting the actuator 128, 129 to the platform 110. The connector 312, 313 is designed to connect to an opening in the platform 110 so that the connectors 312, 313 are embedded in the platform 110 enabling the platform bottom surface 112 to rest on the truck bed floor 13 when the platform is in a lowered position. However, in an alternative connection arrangement the connectors 312, 313 could connect to the underside 112 of the platform 110.

Figure 10:
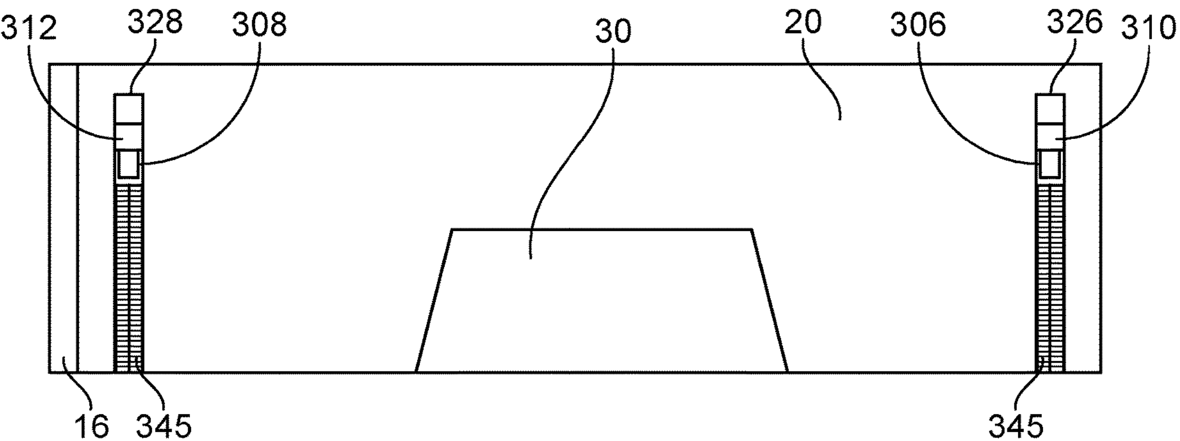
FIG. 10 provides a side view of the truck bed wall of the additional embodiment of the truck bed system, wherein the system utilizes telescoping vertical actuators located inside of the truck bed side walls and the lift platform connected via vertical slots in the truck bed side walls, which are protected by a brush seal.

As seen in FIG. 10, which shows a side view of the left side truck bed wall 10, the rear vertical slot 328 and front vertical slot 326 are sized to allow the platform 110 to move from a lowered position to a fully raised position. The rear connector 308 and front connector 306 are located outside of the truck bed wall 20 cavity but inside of the truck bed 12 (for connecting to the platform 110). The rear vertical slot 328 is located near the tailgate 16 and the front vertical 312 slot is located near the truck bed front wall 14 (see FIG. 1A). The vertical guide rails or slots 326, 328 may include a brush seal 345 opening to prevent or minimize debris and dirt from entering into the slots 326, 328 but still allow the extensions brackets 306, 308, 309 to freely move up and down the vertical slots 326, 328, 329. The right front vertical slot is not depicted in FIGS. 9 and 10 but would comprise the same design and elements as the other slots 326, 328, 329. Thus, as the control switch 115 is activated, it powers the motors 230 connected to the actuators 126, 127, 128, 129 to raise or lower the actuators 126, 127, 128, 129. The extension brackets 306, 308, 309 (right front bracket not shown or numbered), bracket platform connectors 310, 312, 313 (right front bracket platform connector not shown or numbered), and platform 110 then move as the actuators 126, 127, 128, 129 move.

Figures 11A, 11B:
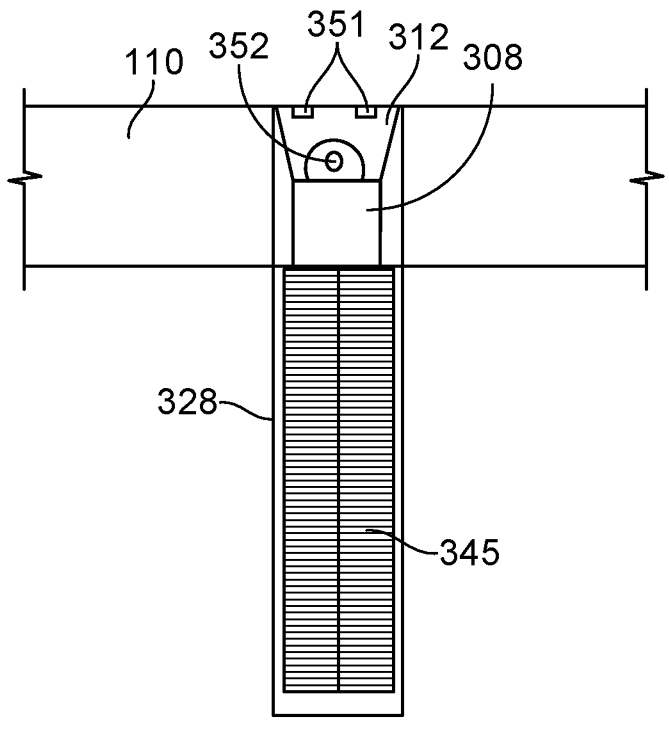
FIG. 11A provides a cutaway side view of the truck bed system of FIG. 10 wherein the connection to the platform is depicted in greater detail.
FIG. 11B provides a cutaway rear view of the truck bed system of FIG. 10 wherein the connection to the platform is depicted in greater detail.

FIG. 11A provides additional details showing the vertical slot 328 and brush seal 345. The extension bracket or bar 308 is connected to the bracket platform connector 312 in a pivot arrangement or mechanism 352 which allows the platform 110 to pivot or rotate relative to the vertical actuators. The bracket platform connector 312 has one or more connectors 351 for connecting the connector 312 to the platform 310. The pivot connection arrangement 352 allows the platform 110 to tilt. Access door panels can be provided on the truck bed wall(s) 20, 21 of the truck bed 12 serving as a cover directly over the housing of the actuators around or near the vertical guide rail to provide convenient maintenance access.

Figure 12:
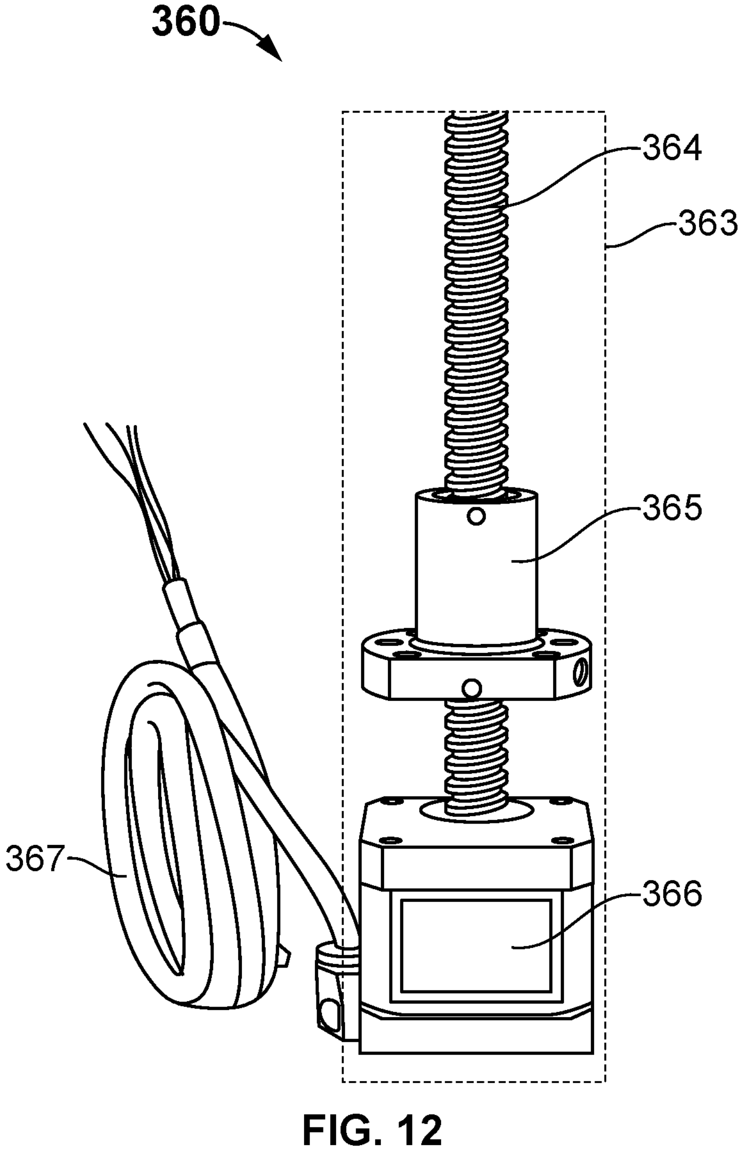
FIG. 12 provides a cutaway view of an alternative vertical actuator for use in raising and lowering the platform of the truck bed system.

As seen in FIG. 12, the system may also employ different actuators or lifting mechanisms such as a nut screw system 360. The nut screw system 360 includes a motor 366 which powers a screw 364 which can rotate in a clockwise or counterclockwise direction. As the screw 364 turns a collar lift nut 365, which is threadedly mated with the screw 364, is raised or lowered depending on the direction the screw turns. Motor 366 has a power cord 367 for connecting power to the motor 366. The collar lift nut 364 can have a platform extension bar 308, 309 (as seen in FIG. 9) attached to extend through the side wall 20, 30 through the vertical slots 328, 329. The nut screw system 360 could be contained within a separate housing 363 which helps protect the screw 364 and collar nut 365 and makes for easier installation of the system. The housing 363 would have a vertical slit opening (not shown) as well so that the actuator extension bar 308, 309 needs to extend through the housing 363 and the vertical slots 328, 329. Alternatively, the nut screw system 360 could be attached to the truck bed side walls 20, 30 (not within the truck bed walls 20, 30). In such instance, the platform 110 would have a shape along its edges to accommodate a cutout around the vertical housing 363.

This alternative lift mechanism 360 design provides the added benefit of hiding the working elements of the alternative lift mechanism 360 from view even when the platform 110 is elevated. Further, this alternative lift mechanism 360 takes up minimal space on the truck bed floor 13, and the risk of inadvertently damaging the lift actuators from the typical wear-and-tear of slinging material under the elevated platform 110 is substantially minimized. In one design, this alternative lift mechanism could have a lift mechanism located in each corner of the truck bed 12 (i.e., near the corners of the platform 110 and not within trays 150).

Figure 13:
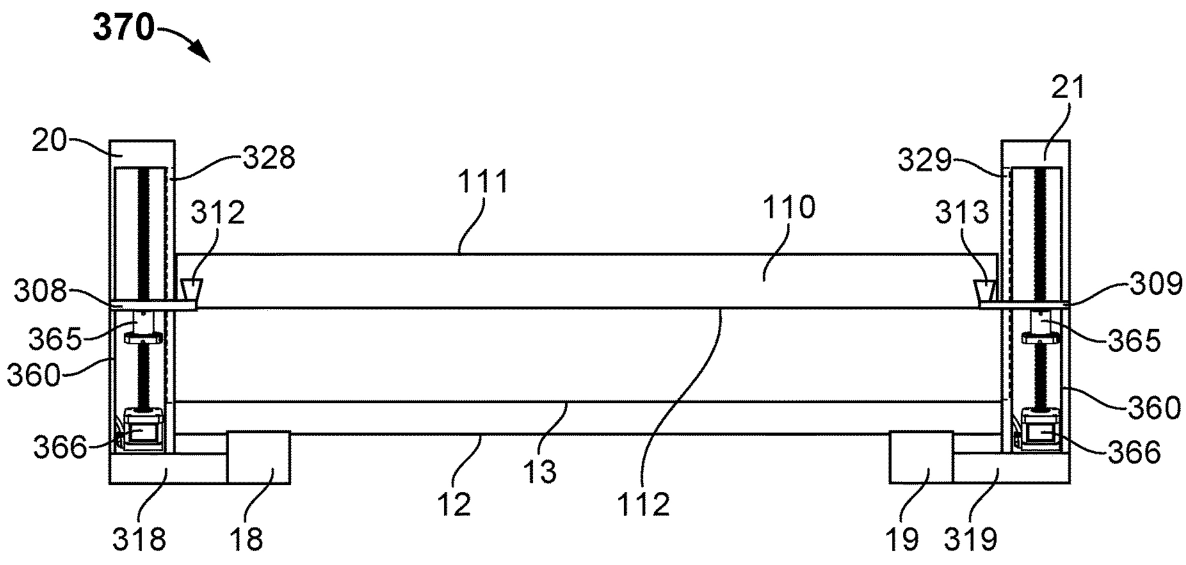
FIG. 13 provides a cutaway rear view of an additional embodiment of the truck bed system utilizing an alternative vertical actuator located inside the truck bed walls for use in raising and lowering the platform of the truck bed system.

FIG. 13 provides a rear cut away view of an alternative lift actuator system which shows the two rear alternative actuators 360 embedded within the left truck wall 20 and the right truck wall 21. The truck 10 has a left side chassis member 18 and a right-side chassis member 19. The chassis or frame of the vehicle supports the weight of the vehicle or truck 10 which typically has a suspension connected to the chassis and the suspension is connected to the wheels. Above the chassis of truck 10 is the truck cab 11 and the truck bed 12 (in the rear). The truck bed 12 is supported by the left side chassis member 18 and right-side chassis member 19. Attached to the left side chassis member 18 is a left side chassis bracket 318 and attached to the right-side chassis member 19 is a right-side chassis bracket 319. The brackets 318, 319 provide support for the base of the left-side actuator 360 and the right-side actuator 360. The brackets 318, 319 extend below or into the cavity in the truck bed walls 20, 21. Each actuator 360 fits within the cavity in the truck bed walls 20, 21. Each actuator 360 has a lift nut 365 which moves up or down as the screw 364 (see FIG. 12) turns in its respective rotation. An extension bar 308, 309 attached to the lift nut 365. The screw 364 runs the approximate full height of the truck bed wall 20, 21 or has a vertical height high enough for the platform 110 to be fully lowered and raised. The extension bar 308, 309 extends through a vertical slot in the nut screw actuator housing 363 and through a vertical slot 328, 329 in the truck bed wall 20, 21. The vertical slot in the nut screw housing 363 and vertical slot 328, 329 in the truck bed wall 20, 21 enable the extension bar 308, 309 to extend into the truck bed area. The extension bar 308, 309 has a platform connector 310, 311 for connecting the actuator 360 to the platform 110. The connector 310, 311 is designed to connect to an opening in the platform 110 so that the connectors 310, 311 are encased in the platform 110. This allows the platform bottom surface 112 to rest on the truck bed floor 13 when the platform is in a lowered position. However, in an alternative connection arrangement the connectors 310, 311 could connect to the underside 112 of the platform 110.

Figure 14:
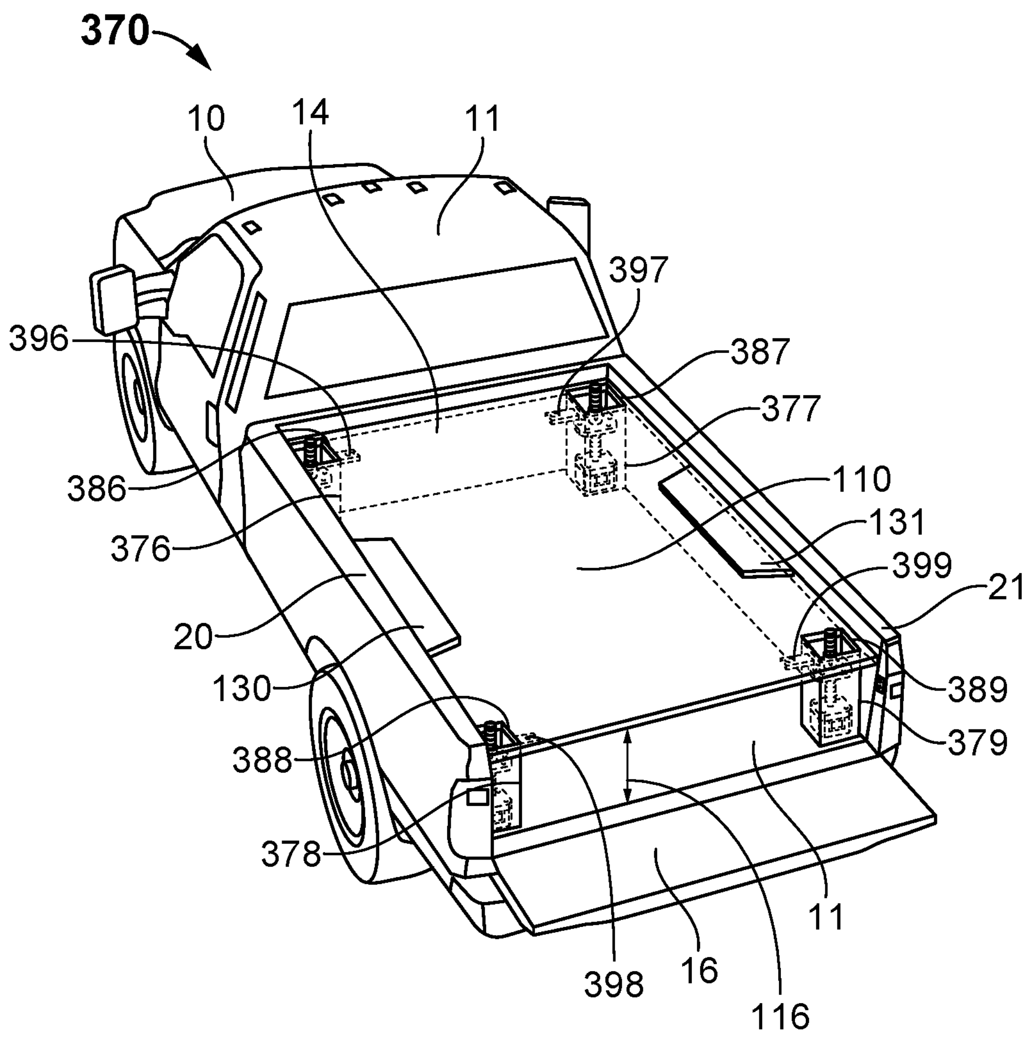
FIG. 14 provides a perspective view of an additional embodiment of the truck bed system utilizing alternative vertical actuators attached to the side of the truck bed walls for use in raising and lowering the platform of the truck bed system.

Referring now to FIG. 14, a truck bed system 370 is shown employing a plurality of alternative nut screw actuators 376, 377, 378, 379 (reference number 360 in FIG. 12). The actuators 376, 377, 378, 379 are similar to the actuator installation shown in FIG. 13, except that the housing 363 of each actuator 376, 377, 378, 379 is connected to the exterior surface of the inside of the side walls 20, 21 of the truck bed 14 (inside the truck bed but not inside the side walls 20, 21). The perimeter edge of the platform 110 is designed with cutouts 386, 387, 388, 389 at each actuator 376, 377, 378, 379 location so that the platform 110 can move up and down along the actuator housing 363 as the platform 110 moves up and down within the truck bed 12. The actuator components including the screw 364, lift nut 365, motor 366 and wire 367 are contained within the housing 363. The housing 363 includes a vertical slot (not depicted) allowing an extension bar connector 396, 397, 398, 399 to connect the lift nut 365 to the platform 110. The connection could be similar to the connection bars 308, 309 and connectors 312, 313 shown in FIG. 13. Further, cutouts in the truck bed floor 13 and trays 150 sized to accommodate the housing 363 could be used to lower the nut screw actuators to enable the platform 110 to rest upon the truck bed floor 13 in a fully lowered position. The configuration of the present invention illustrated in FIG. 14 is ideally suited for an aftermarket installation. Further, the actuators 126, 127, 128, 129 shown in FIGS. 1B and 1C could also be used with each scissor jack type actuator contained within a scissor jack actuator housing and where such housing is attached to the truck bed side wall.

The motor 366 could be laterally offset so that the motor 366 does not interfere with the lift nut 365 fully closing (i.e., the lowest position) so that the platform 110 can be fully lowered so that it rests on top of the truck bed floor 13. The motor(s) 366 would be controlled and activated as previously described or as herein described including through one or more switches 115, or through a mobile application or other device.

Although not depicted, alternative designs for the lift mechanism or actuators for raising and lowering of the platform 110 could employ telescoping or piston style risers, chain-on-sprocket or cable-on-pulley design. The chain-on-sprocket or cable-on-pulley design elevates and supports the load of the platform 110 by connection to the extension bar 308, 309 and/or connectors 310, 311. In this alternative approach, a chain-on-sprocket or cable-on-pulley mechanism could be housed within the truck bed wall behind a Vertical Guide Rail or within a housing located approximate and/or connected to the exterior surface of the inside of the side walls 20, 21 of the truck bed 14 (inside the truck bed and not inside the side walls 20, 21). Such housing would provide an ideal solution for an after-market installation. This chain-on-sprocket or cable-on-pulley design would include one or more sprockets or pulleys, depending on the location of the drive mechanism (such as an electric motor positioned within the housing either at the top of the housing or at the bottom of the housing). The chain or cable extends around the sprocket(s) or pulley(s) to connect to a bracket attachment that extends through a vertical guide rail. The platform 110 would be attached to the one or more brackets which extend through or from the one or more vertical guide rails. An access door panel could be provided on the inside walls of the truck bed 12 as a cover directly over the housing of this lift mechanism around or near the vertical guide rail to provide convenient maintenance access to the lift mechanism.

The actuators described herein are designed to lift significant weight allowing the platform 110 to carry significant weight. The maximum load capacity for most pickup truck beds in the market is 1-1.5 tons. Motorized scissor lift jacks for use in some embodiments of the present invention can lift 1-2 tons each. Combined, the plurality of scissor jacks allow the platform to be raised while holding significant weight. However, the weight should not exceed the capacity of the truck 10 or the platform 110.

Figure 15:
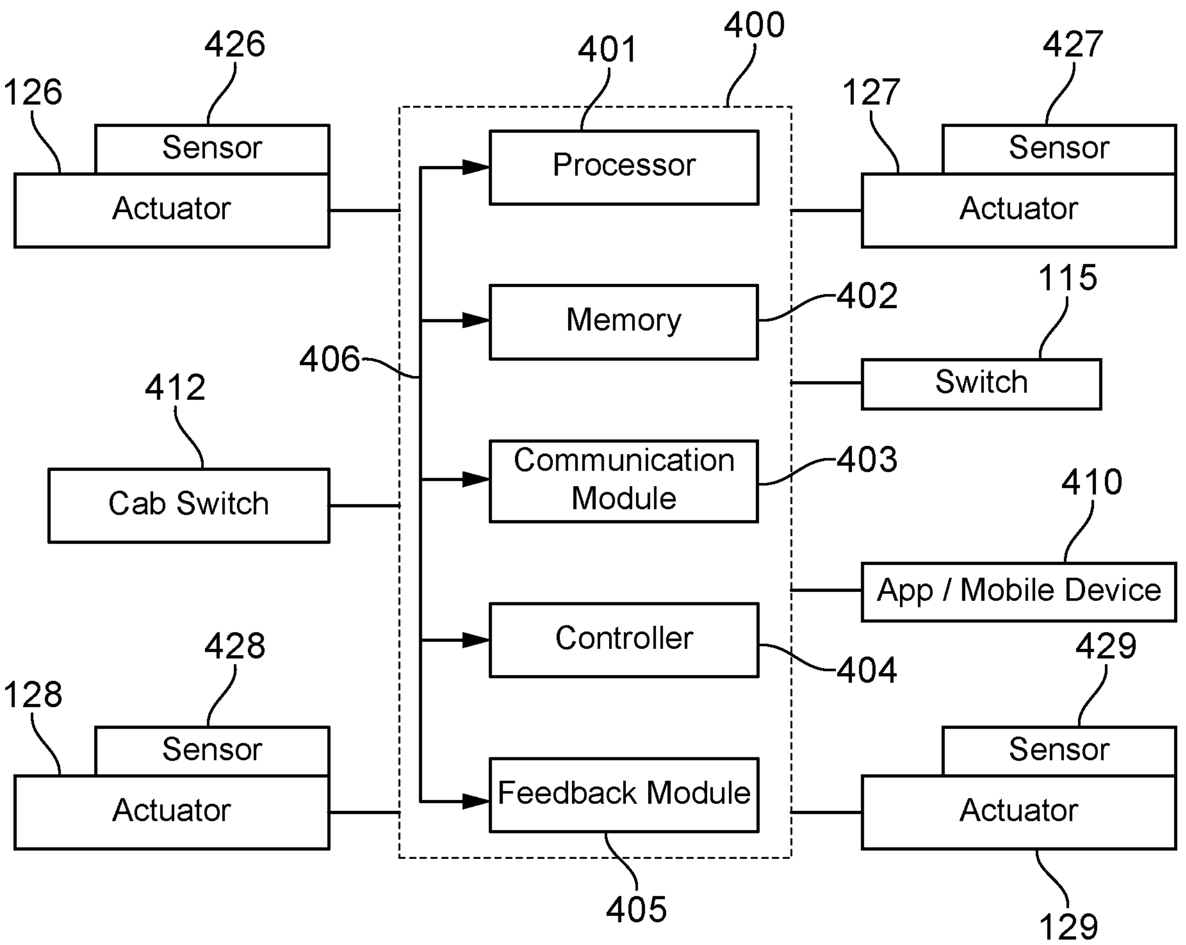
FIG. 15 provides a schematic view of the processor unit for controlling the raisable platform.

Referring to FIG. 15, the system may include one or more computing systems 400 or elements to control the system 100 or control elements within the system 100. The computing system 400 can include one or more processors 401. As used herein, "processor" means any component or group of components that are configured to execute any of the processes described herein or any form of instructions to carry out such processes or cause such processes to be performed. In some arrangements, the processor(s) 401 can include a vehicle electronic control unit (ECU).

The processor system 400 can include memory 402 for storing one or more types of data and/or software instructions which allow the processor(s) 401 to control one or more elements of the system 100 through the controller 404. The memory 402 may be comprised of volatile and/or non-volatile memory. The memory 402 can be a component of the processor(s) 401, or the memory 402 can be operatively connected to the processor(s) 401.

The processor system 400 can interact with or include one or more input/output systems such as any device, component, system, element or arrangement or groups thereof that enable information/data to be received, processed, or controlled by the processor system 400 including the control switch 115, a cab switch 415, sensors 426, 427, 428, 429 connected to the actuators 126, 127, 128, 129, or a remote device or application 410 such as a mobile device. The input can include any suitable mechanism such as a keypad, display, touch screen, multi-touch screen, button, joystick, mouse, trackball, microphone and/or any combinations thereof.

The processor system 400 also includes a controller 404 and communication module 403 which enable information/data to be presented to a vehicle user or control one of the devices 115, 412, 410 or actuators 126, 127, 128, 129. The communication could be through a communication device (i.e., transmitter or transceiver) and use logical communication technologies including cabled connection, internet, Bluetooth, or any other logical communication technology. The processor system 400 could also include, be connected, or use a microphone, earphone and/or speaker. Some components of the processor system 400 may serve as both an input or output device.

The process system 400 includes one or more modules 403, 404, 405 which can be implemented as computer readable program code that, when executed by a processor 401, implement various processes. The module(s) 403, 404, 405 can be configured to perform various functions, including, for example, communicating with the remote device 410, analyzing and storing user preferred platform 110 heights and tilt settings based on the feedback module 405.

The processor system 400 is connected to the truck 10 or vehicle power and can be connected to and control the actuators 126, 127, 128, 129. The processor system 400 can control the actuators 126, 127, 128, 129 by controlling power to the one or more motors 230.

The system can also include a feedback module 405 which can use information from the sensors 426, 427, 428, 429 to verify, check, or control the actuators to keep them level or in the desired position (i.e., tilted position). The sensors 426, 427, 428, 429 could be height or location sensors or sensors tied to the actuators to provide feedback on each actuator's current vertical position, operating condition (operating or not operating), or other error or maintenance requirements or information. The sensors 426, 427, 428 429 or other sensors incorporated into the system can determine, assess, monitor, measure, quantify, and/or sense one or more aspects of the vehicle 10, the truck bed 12, the actuators 126, 127, 128, 129, and/or the system 100 or 400. The sensors provide feedback, through the feedback module 405, the communication module 403 or to the processor 401 or controller 404 allowing the processor system 400 to determine when to move the platform 110 through the actuators 126, 127, 128, 129.

For example, the processor system 400 can determine when an input has been received to move the platform 110 to a desired position. The sensors can also determine different aspects of the load on the platform or if there are materials below the platform which might prevent lowering the platform 110 or damage the system 100 or materials being carried. Another example might sense that the platform has reached the top of the side walls 20, 21 so the user knows the platform 100 is raised to a position level to the top of the side walls so the platform can act as protective device of materials in the truck bed 12.

It will be appreciated that present invention provides flexibility in hauling, organizing and storing cargo items in a pickup truck bed 12 or other vehicle capable of carrying loads of various materials. The various embodiments described herein can provide an adjustable weight bearing platform 110 that can serve as both a truck bed floor when in a lowered position, a second platform for carrying material when in a raised position or a protective truck bed cover when in a raised position. As previously discussed and as seen in FIG. 16, the present invention allows the platform 110 to be tilted in a forward direction (i.e., the rear of platform 110 is at an elevation higher than the front of the platform 110) or tilted in a rearward direction (i.e., the rear of the platform 110 is at an elevation lower than the front of the platform 110). The forward direction tilt, as depicted in FIG. 16, is ideal for preventing the load carried on the platform 110 from sliding off the platform 110. For example, long plank lumber or sheets of plywood as shown in FIG. 16. The rearward direction tilt is ideal for loading or unloading large materials or disaggregated materials carried by the platform.

Although the embodiments described herein focus on electric motors to drive the actuators, the system of the present invention could employ other types of motors including pneumatic motors (i.e., air motors) or hydraulic motors (i.e., fluid). Further, the electric motors could be alternating current or direct current motors. A pneumatic system or hydraulic system could have four motors, one for each actuator, or could have one motor which pushes air or hydraulic fluid to each actuator through piping or tubing. The tubing could have valves controlled by the processor system 400, via controller 404, which would allow the user to control all actuators simultaneously or each actuator independently (i.e., for leveling or tilting). The systems, components and/or processes described herein including the processor system 400 can be realized in hardware or a combination of hardware and software and can be realized in a centralized fashion in one processing system or in a distributed fashion where different elements are spread across one or more interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein.

It should be understood that the illustrated embodiments are exemplary only and should not be taken as limiting the scope of the invention. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

The invention claimed is:

1. A powered raisable platform system for a vehicle comprising:
- a plurality of powered actuators, each having a motor and an actuator mount configured to connect the powered actuator to the vehicle;
- a rigid, weight bearing platform configured to fit within a cargo area of the vehicle and to move in a vertical direction above a cargo floor of the vehicle;
- a plurality of extension brackets, each extension bracket being coupled to a corresponding powered actuator;
- a plurality of platform connectors, each platform connector being coupled to a corresponding extension bracket through a pivot arrangement, the pivot arrangement permitting the rigid platform to pivot or tilt relative to the powered actuators during raising and lowering; and
- the motor of each powered actuator connected to a power source through a bi-directional control device operative to raise and lower the powered actuators.

2. The powered raisable platform system of claim 1, wherein when the bidirectional control device is activated in a second direction the bidirectional control device enables the motor of each of the plurality of powered actuators to move the powered actuators in the second direction; and wherein as the plurality of powered actuators move in the second direction the rigid weight bearing platform moves in the second direction.

3. The powered raisable platform system of claim 1, further comprising:
- a plurality of trays for placement in the cargo floor of the vehicle, wherein each of the plurality of trays receives a base of each of the plurality of powered actuators.

4. The powered raisable platform system of claim 1, wherein each actuator mount is configured to attach to the vehicle in a support location where a vehicle frame support member supports the actuator mount.

5. The powered raisable platform system of claim 4, wherein the vehicle is a truck and the plurality of actuators are attached to the truck in a cavity within a truck bed side wall.

6. The powered raisable platform system of claim 5, further comprising:
- a plurality of vertical slots in the truck bed side wall, wherein each slot receives a platform connector for connecting the actuator to the platform; wherein as the plurality of powered actuators move the connector moves along the vertical slot to raise or lower the platform.

7. The powered raisable platform system of claim 1, wherein each of the plurality of powered actuators are a scissor type lift actuator.

8. The powered raisable platform system of claim 1, wherein each of the plurality of powered actuators are a nut screw type actuator.

9. The powered raisable platform system of claim 1, wherein the vehicle is a truck and the cargo area is a truck bed.

10. The powered raisable platform system of claim 1, wherein the motor is an electrically driven motor and the bidirectional control device is a switch which connects electrical power to the motor.

11. The powered raisable platform system of claim 1, wherein a bottom surface of the rigid weight bearing platform rests on the cargo floor when the rigid weight bearing platform is in a fully lowered position.

12. A powered raisable platform system for a truck bed comprising:
- a rigid weight bearing platform shaped to fit within the truck bed;
- a left front powered actuator positioned in a left front location in the truck bed;
- a left rear powered actuator positioned in a left rear location in the truck bed;
- a right front powered actuator positioned in a right front location in the truck bed;
- a right rear powered actuator positioned in a right rear location in the truck bed;
- each powered actuator having a motor and an actuator mount configured to connect the powered actuator to the truck bed;
- a plurality of extension brackets, each extension bracket being coupled to a corresponding powered actuator;
- a plurality of platform connectors, each platform connector being coupled to a corresponding extension bracket through a pivot arrangement, the pivot arrangement permitting the rigid platform to pivot or tilt relative to the powered actuators during raising and lowering; and
- a bi-directional control device connected to each motor and operative to raise and lower the powered actuators simultaneously or independently.

13. The powered raisable platform system of claim 12, wherein each motor is an electrically driven motor.

14. The powered raisable platform system of claim 12, wherein each motor is a pneumatic air motor.

15. The powered raisable platform system of claim 12, wherein each actuator is a scissor type lift actuator.

16. The powered raisable platform system of claim 12, wherein each actuator is a nut screw type lift actuator.

17. The powered raisable platform system of claim 12, wherein each actuator mount is configured to connect each actuator to a truck bed side wall.

18. The powered raisable platform system of claim 12, wherein each actuator mount is configured to connect each actuator to a cavity within a truck bed wall.

19. The powered raisable platform system of claim 12, wherein each actuator mount is configured to connect each actuator to a truck bed floor.

20. The powered raisable platform system of claim 12, wherein a bottom surface of the rigid weight bearing platform rests on a truck bed floor when the rigid weight bearing platform is in a fully lowered position.

21. The powered raisable platform system of claim 12, wherein each actuator is contained within an actuator housing.

22. The powered raisable platform system of claim 1, wherein each motor is a hydraulic motor.

23. The powered raisable platform system of claim 12, wherein each of the plurality of powered actuators is a hydraulic motor actuator.

* * * * *